United States Patent
Fitzsimmons et al.

(10) Patent No.: US 8,337,627 B2
(45) Date of Patent: Dec. 25, 2012

(54) CLEANING EXHAUST SCREENS IN A MANUFACTURING PROCESS

(75) Inventors: John A. Fitzsimmons, Hopewell Junction, NY (US); Richard O. Henry, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 12/571,477

(22) Filed: Oct. 1, 2009

(65) Prior Publication Data

US 2011/0079255 A1    Apr. 7, 2011

(51) Int. Cl.
*B08B 3/08* (2006.01)
*B01D 41/04* (2006.01)
*B01D 29/66* (2006.01)

(52) U.S. Cl. ....... 134/18; 134/56 R; 134/57 R; 210/106; 210/409; 210/741

(58) Field of Classification Search ............. 134/18, 134/38, 56 R, 57 R, 113; 210/102, 106, 141, 210/741, 797, 409; 95/278, 281
See application file for complete search history.

(56) References Cited

U.S. PATENT DOCUMENTS

| | | | | |
|---|---|---|---|---|
| 4,375,487 A | * | 3/1983 | Huber | 427/195 |
| 4,803,946 A | | 2/1989 | Ravishankar | |
| 4,984,595 A | * | 1/1991 | Josefsson | 134/38 |
| 5,298,161 A | * | 3/1994 | Sieg | 210/321.78 |
| 5,562,772 A | | 10/1996 | Neoh | |
| 5,593,585 A | * | 1/1997 | Groetzinger | 210/409 |
| 5,916,368 A | | 6/1999 | Ebert | |
| 5,972,078 A | | 10/1999 | Collins et al. | |
| 6,068,729 A | | 5/2000 | Shrotriya | |
| 6,918,397 B2 | | 7/2005 | Lin et al. | |
| 7,360,546 B2 | | 4/2008 | Doi | |
| 7,442,291 B1 | * | 10/2008 | Discenzo et al. | 210/85 |
| 2008/0156719 A1 | * | 7/2008 | Tabor | 210/409 |
| 2009/0065066 A1 | * | 3/2009 | Ono | 137/13 |

FOREIGN PATENT DOCUMENTS

JP    2001-137625    5/2001

OTHER PUBLICATIONS

Ge Melvin et al., "Mask Cleaning Process", IP.com No. IPCOM000073563D, Original Publication Date: Jan. 1, 1971, Original Disclosure Information: TDB 01-71 p. 2156, IP.com Electronic Publication: Feb. 22, 2005, pp. 3.

* cited by examiner

*Primary Examiner* — Michael Kornakov
*Assistant Examiner* — Natasha Campbell
(74) *Attorney, Agent, or Firm* — Cantor Colburn LLP; Ian MacKinnon

(57) ABSTRACT

A method of cleaning an screen in a manufacturing process step that employs a chamber including a drain line having a screen configured and disposed in the chamber above the drain line to trap soluble materials includes detecting a build-up of soluble material on the screen, ceasing a work operation in the chamber, and initiating a screen cleaning operation. The screen cleaning operation includes closing a computer operated valve fluidly connected to the drain line to fluidly isolate a portion of the chamber, automatically introducing an amount of solvent into the chamber once the computer operated valve is closed with the amount of solvent filling the chamber and/or the drain line to fully immerse the screen, and opening the operated valve after a predetermined amount of time to empty the chamber and the drain line of solvent once the soluble materials trapped on the screen are dissolved.

20 Claims, 7 Drawing Sheets

CLEANING EXHAUST SCREENS IN A MANUFACTURING PROCESS

BACKGROUND

The present invention relates to manufacturing, and more particularly, to a system and method for unclogging screens in a manufacturing process.

Many manufacturing processes employ systems that utilize volatile chemicals. The use of volatile chemicals further requires the use of flame arrestor screens across exhaust and or drain areas in order to prevent a flash-over. In certain cases, both exhaust and drain areas are located below the flame arrestor. In many processes, the volatile chemicals are utilized as a solvent to dissolve soluble materials. In semiconductor manufacturing for example, flammable solvents are utilized to dissolve polymeric materials. Over time, the dissolved polymeric materials accumulate on the flame arrestor clogging both the drain and the exhaust area. Clogged screens directly affect process conditions which may ultimately have a negative impact on product quality.

Present methods for unclogging the flame arrestor include a "brute force" method in which copious amounts of solvent are passed through the system. While effective, solvent itself is costly. Also, given the nature of the chemicals in the solvent, disposal of the solvent can also be quite costly, often times costing more than the solvent itself. As such, the brute force method not only includes a high initial cost associated with the large amounts of solvent required, but also incurs a large post cleaning/disposal cost. In addition, the brute force method can be time consuming requiring a substantial system down time. Alternatively, or in addition if the brute force method is not efficacious, the system is disassembled and the screen is physically removed for cleaning. Once removed, the screen is flushed with solvents to dislodge any trapped material. Removing the screen from the process results in substantial production down time as well as introduces a potential for improper screen replacement and/or physical damage.

SUMMARY

According to one embodiment of the present invention, a method of cleaning a screen in a manufacturing process step that employs a chamber including a drain line having a screen configured and disposed in the chamber above the drain line to trap soluble materials includes detecting a build-up of soluble material on the screen, ceasing a work operation in the chamber, and initiating a screen cleaning operation. The screen cleaning operation includes closing a computer operated valve fluidly connected to the drain line to fluidly isolate a portion of the chamber, automatically introducing an amount of solvent into the chamber once the computer operated valve is closed with the amount of solvent filling one of the chamber and the drain line to fully immerse the screen, and opening the computer operated valve after a predetermined amount of time to empty the one of the chamber and the drain line of solvent once the soluble materials trapped on the screen are dissolved.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
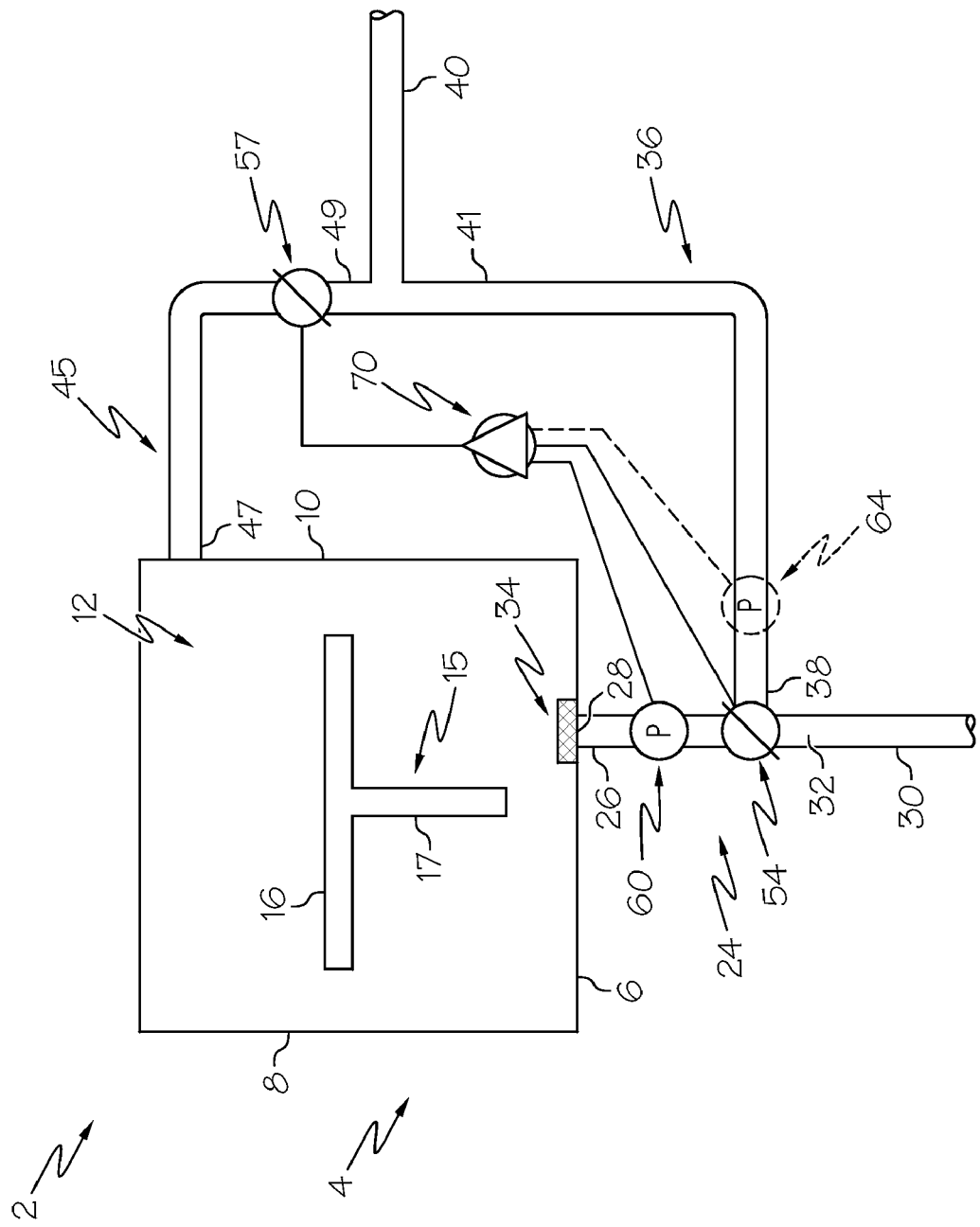
FIG. 1 is a schematic diagram of a manufacturing process step including a chamber having a drain line provided with a screen, and a system for cleaning the screen in accordance with an exemplary embodiment.

With reference now to FIG. 1, a manufacturing/production process step in accordance with an exemplary embodiment is indicated generally at 2. Process step 2 includes a process chamber 4 having a bottom wall 6, a first sidewall 8, and a second sidewall 10, as well as additional sidewalls (not shown), that collectively define an interior or processing portion 12. Process step 2, in accordance with the exemplary embodiment, is employed in connection with the production of semiconductor wafers. Towards that end, a wafer chuck 15 is arranged within the process chamber 4. Wafer chuck 15 includes a base or wafer support portion 16 as well as a pedestal member 17. Pedestal member 17 elevates base/wafer support 16 above bottom wall 6. At this point, it should be understood that while described in connection with the production of semiconductor wafers, the present invention can be employed in connection with various other manufacturing processes that employ soluble materials in a manner that will become more fully evident below.

Process chamber 4 includes a drain line 24 having a first end portion 26 including an opening 28 exposed to interior portion 12. First end portion 26 extends to a second end portion 30 through an intermediate portion 32. Second end portion 30 leads to a used solvent collection area (not shown). In the exemplary embodiment shown, a flame arrestor screen 34 is positioned across opening 28. Of course flame arrestor screen could also be inset into opening 28. In any event, flame arrestor screen 34 is configured and disposed to prevent flash backs within process chamber 4 that may result as a consequence of the use of volatile chemicals.

Process chamber 4 is also shown to include a first exhaust line 36 that extends from intermediate portion 32 of drain line 24. More specifically, first exhaust line 36 includes a first end section 38 that is fluidly connected to intermediate portion 32 of drain line 24. First end section 38 extends to a second end section 40 through an intermediate section 41. Second end section 40 leads to an exhaust gas collection portion (not shown). In addition to first exhaust line 36, process chamber 4 includes a second exhaust line 45 that is arranged above wafer support 16. While a typical wafer processing chamber would not usually include an upper exhaust line due to the propagation of contaminants, as will become more fully evident below, second exhaust line 45 is only exposed to process chamber 4 during a cleaning operation. Second exhaust line 45 includes a first end 47 having an opening (not separately labeled) exposed to interior portion 12 above wafer chuck 15. First end 47 extends to a second end 49 which is fluidly linked to intermediate section 41 of first exhaust line 36. In this manner, second exhaust line 45 fluidly connects interior portion 12 with the exhaust collection point (not shown).

In further accordance with the exemplary embodiment, a first valve 54 is arranged on drain line 24. More specifically, first valve 54 is arranged at a junction of first exhaust line 36 and intermediate portion 32. A second valve 57 is arranged along second exhaust line 45 at a position upstream from second end section 40 of first exhaust line 36. A pressure sensor 60 is arranged at first end portion 26 of drain line 24 upstream from first valve 54. As will be discussed more fully below, pressure sensor 60 is configured to detect an amount of solvent flow through drain line 24. Alternatively, a pressure sensor 64 can be arranged at first end section 38 of first exhaust line 36. At this point, it should be understood that both pressure sensor 60 and pressure sensor 64 can also both be employed in connection with the invention. As will be discussed more fully below, a control system 70 is linked to first and second valves 54 and 57 as well as pressure sensors 60 and 64. Control system 70 is configured to initiate a cleaning operation of screen 34. In the exemplary embodiment shown, control system 70 takes the form of a programmable logic controller (PLC), however, it should be understood that control system 70 can also take the form of a general purpose computer as will become apparent more fully below.

Figure 2:
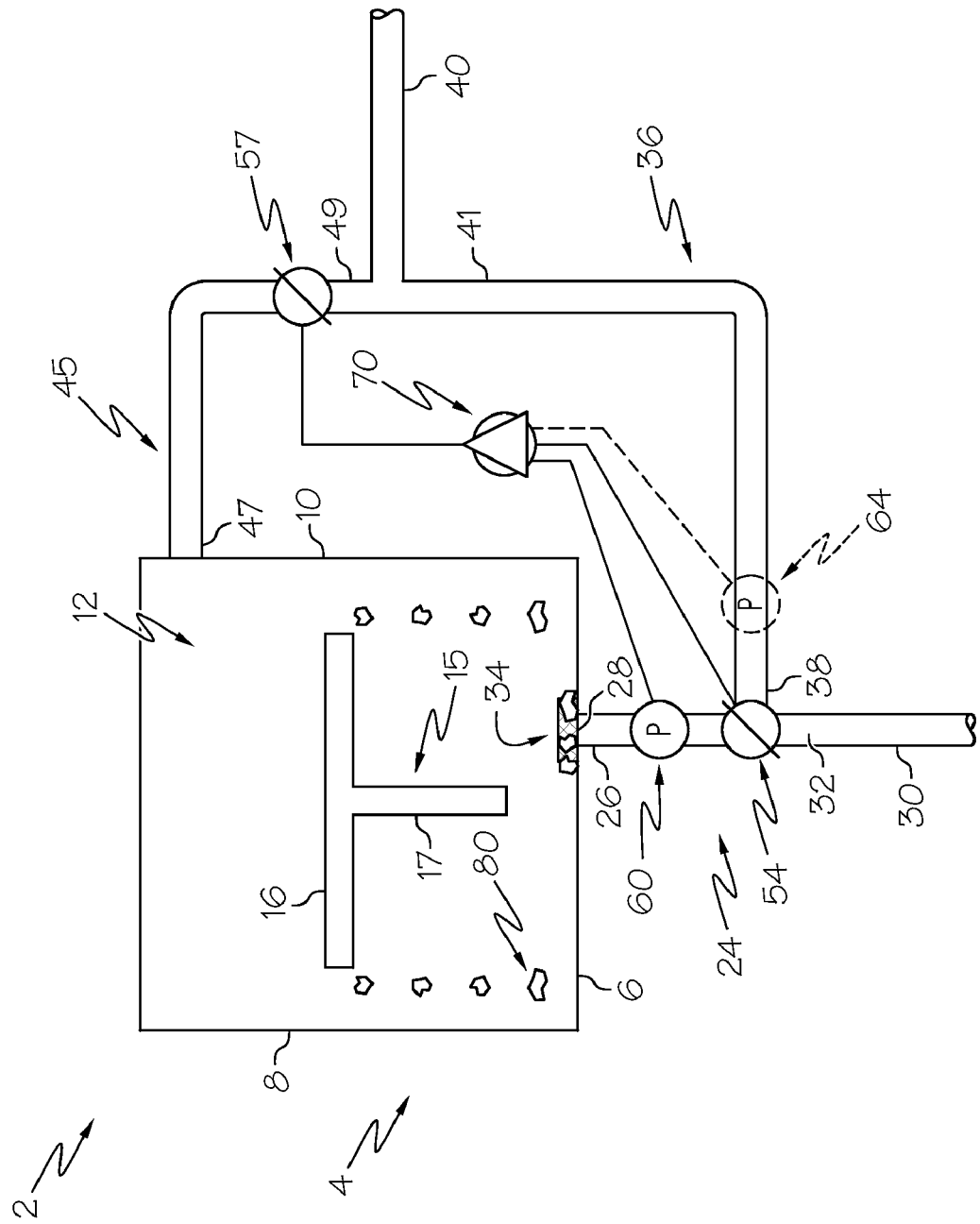
FIG. 2 is a schematic diagram of the manufacturing process step of FIG. 1 illustrating removal of soluble material from an article of manufacture in accordance with the exemplary embodiment.
Figure 3:
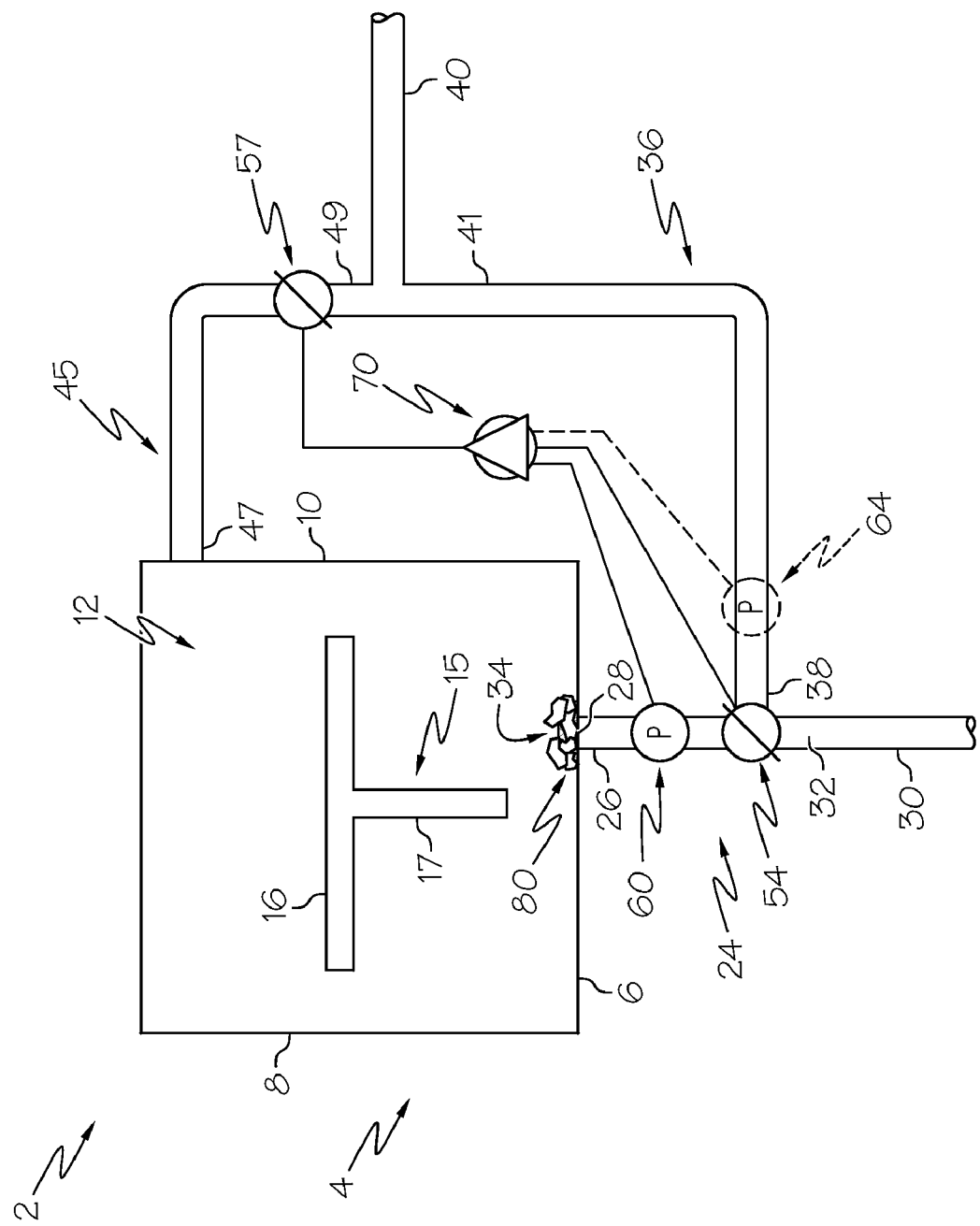
FIG. 3 is a schematic diagram of the manufacturing process step of FIG. 2 illustrating a build-up of soluble material on the screen in accordance with an exemplary embodiment.

As best shown in FIG. 2, during a processing step, soluble material 80, such as photo resist material is removed from a semiconductor wafer supported upon wafer chuck 15. The soluble material 80 falls from wafer support 16 and collects on bottom wall 6. Over time, the soluble material 80 collects on screen 34 as shown in FIG. 3. When enough soluble material collects on screen 34, solvent used in connection with removing the photo resist material no longer flows into drain line 24. In order to ensure that a solvent continues to flow, controller 70 selectively initiates a screened cleaning operation. In accordance with one aspect of the exemplary embodiment, controller 70 detects a build up of soluble material 80 on screen 34. That is, controller 70 detects a pressure differential or loss at one of pressure sensors 60 and 64. A reduction in pressure at pressure sensor 60 can indicate a lack of solvent flow through drain line 24 indicating the presence of a build up of soluble material 80 on screen 34. The particular degree of pressure loss can, for example, be a determination of exactly how much soluble material 80 is built up on screen 34.

Figure 4:
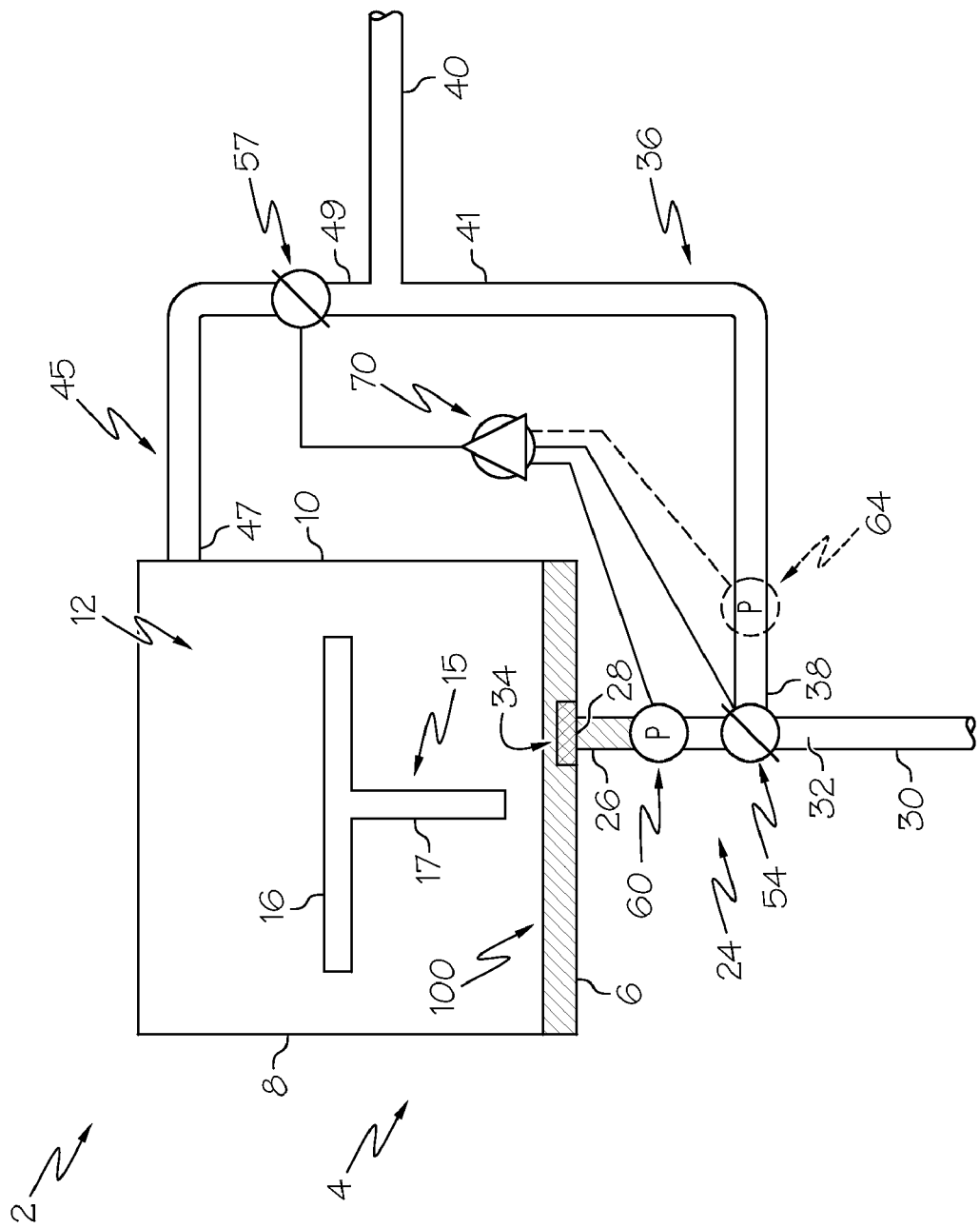
FIG. 4 is a schematic diagram of the manufacturing process step of FIG. 3 illustrating a cleaning operation initiated by the system for cleaning the screen in accordance with the exemplary embodiment.
Figure 5:
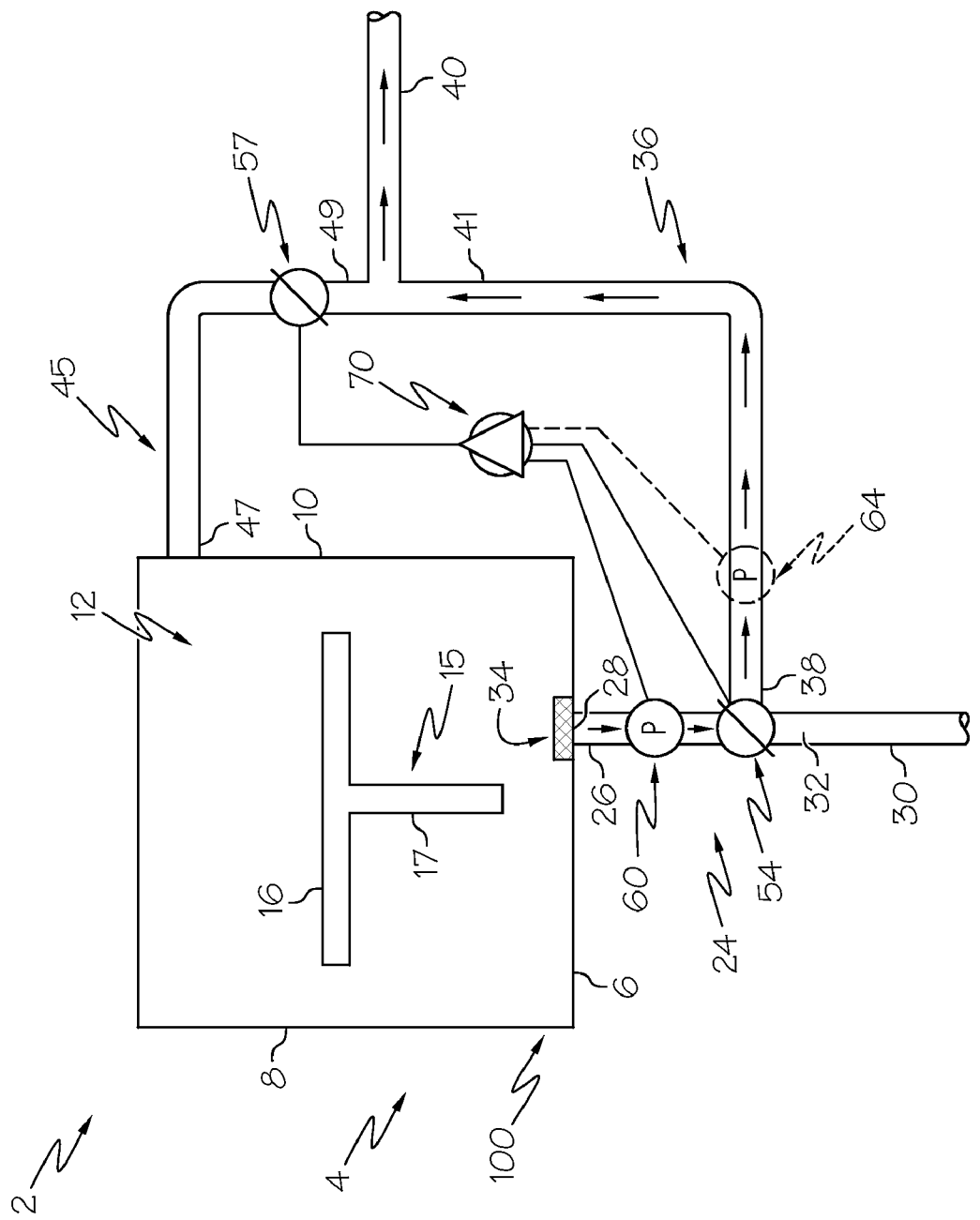
FIG. 5 is a schematic diagram of the manufacturing process step of FIG. 4 following the screen cleaning operation.

In any event, once controller 70 determines that a cleaning operation is required, work operations within processing chamber 4 are halted. After halting work operations within processing chamber 4, valve 54 is closed, thus fluidly isolating second end portion 30 of drain line 24 from process chamber 4 such as shown in FIG. 4. Valve 54 also fluidly isolates first end section 38 of first exhaust line 36. At the same time, valve 57 is opened exposing second exhaust line 45 to second end portion 40 of second first exhaust line 36 to facilitate a continued flow of gases from chamber 4. At this point, an amount of solvent is introduced into process chamber 4. The amount of solvent is added to a level 100 such that screen 34 is fully immersed. Screen 34 remains immersed in solvent for a pre-determined period to allow the build up soluble material 80 to solubalize or dissolve. Once the soluble material 80 on screen 34 has dissolved, such as shown in FIG. 5, valve 54 is opened and valve 57 is closed. At this point, liquid solvent is allowed to pass from process chamber 40 to second end portion 30 of drain line 24.

Figure 6:
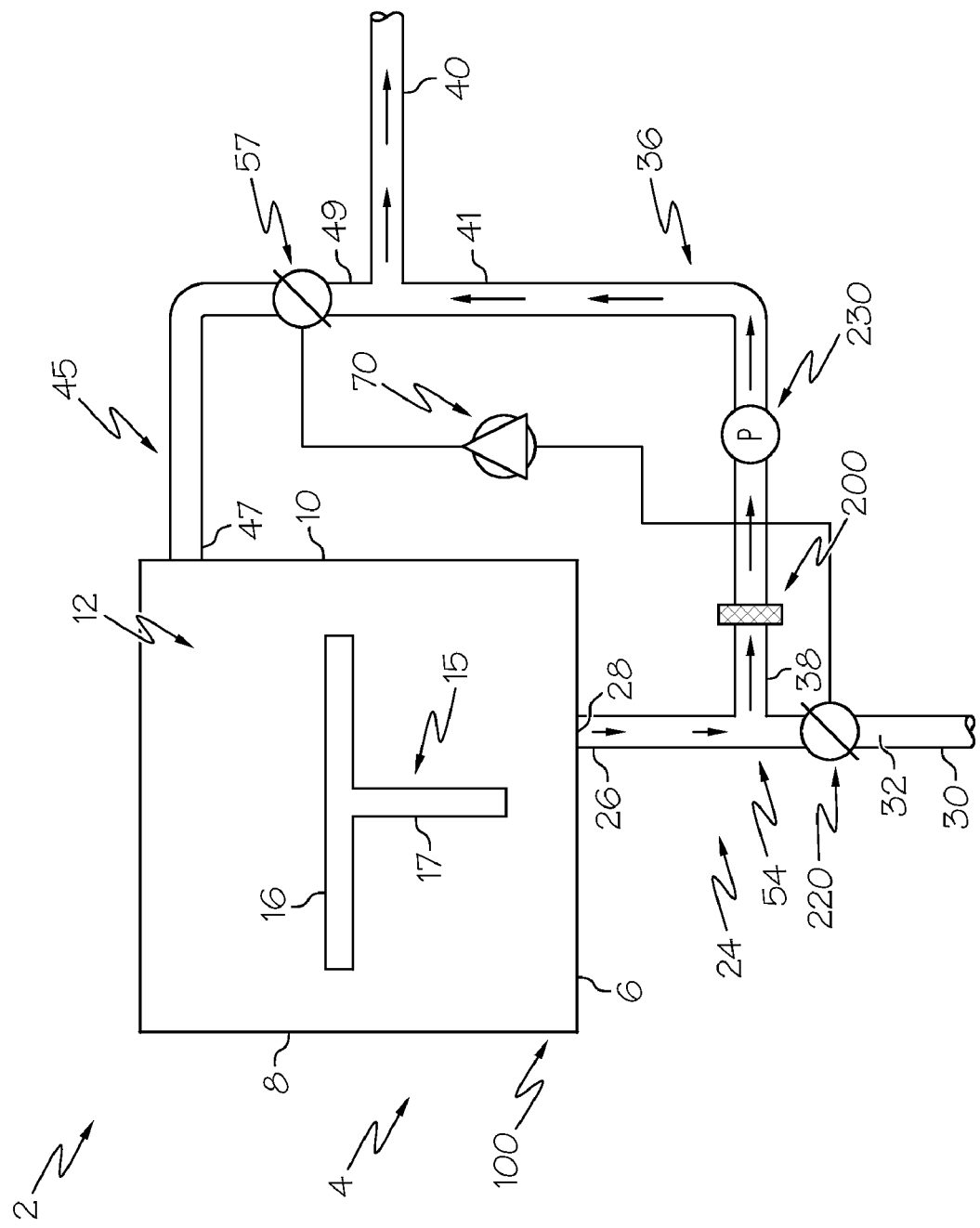
FIG. 6 is a schematic diagram of a manufacturing process step including a chamber having a drain line provided with a screen positioned in accordance with another aspect of the exemplary embodiment.

FIG. 6, wherein like reference numbers represent corresponding parts in the respective views, illustrates an alternative screen location. More specifically, a screen 200 is arranged within first end section 38 of first exhaust line 36. With this arrangement, a valve 220 is arranged downstream of first exhaust line 36 within drain line 24 and a pressure sensor 230 is arranged downstream of first exhaust line 36 relative to screen 200. In this manner, the amount of solvent required to dissolve a built up of soluble materials is even further reduced by minimizing the surface area of screen 200 to be treated. That is, the particular placement of screen 200 requires that the amount of solvent necessary to immerse screen 200 only be sufficient to fill a portion of drain line 24.

The above described exemplary embodiment allow for a minimal use of solvent in order to dissolve a build up of soluble material on a filter screen arranged within a process chamber. That is, instead of a dynamic flushing of large amounts of solvent through processing chamber until a screen is clear, a minimal amount of static solvent is introduced into chamber, allowed rest until the soluble material has dissolved and then passed to the drain. In addition to using less solvent, the present invention eliminates the need to disassemble the process chamber to remove the screen for cleaning thereby reducing process down time. Process down time can be further reduced by the particular timing of the cleaning operation. That is, if experience shows that a pressure drop in the drain line of, for example 50%, requires a 1 hour soak to remove the soluble material, and a pressure drop of, for example 25% requires a 10 minute soak to remove the soluble material, the controller can programmed to initiate the cleaning operation at the lower pressure drop in order to reduce process down time. The use of less solvent allows for more frequent cleanings without an increase in cost. That is, the present invention embodiments reduce the front end or initial cost of solvent, the back end or disposal costs of the solvent and the overall process cost by reducing process down time.

Figure 7:
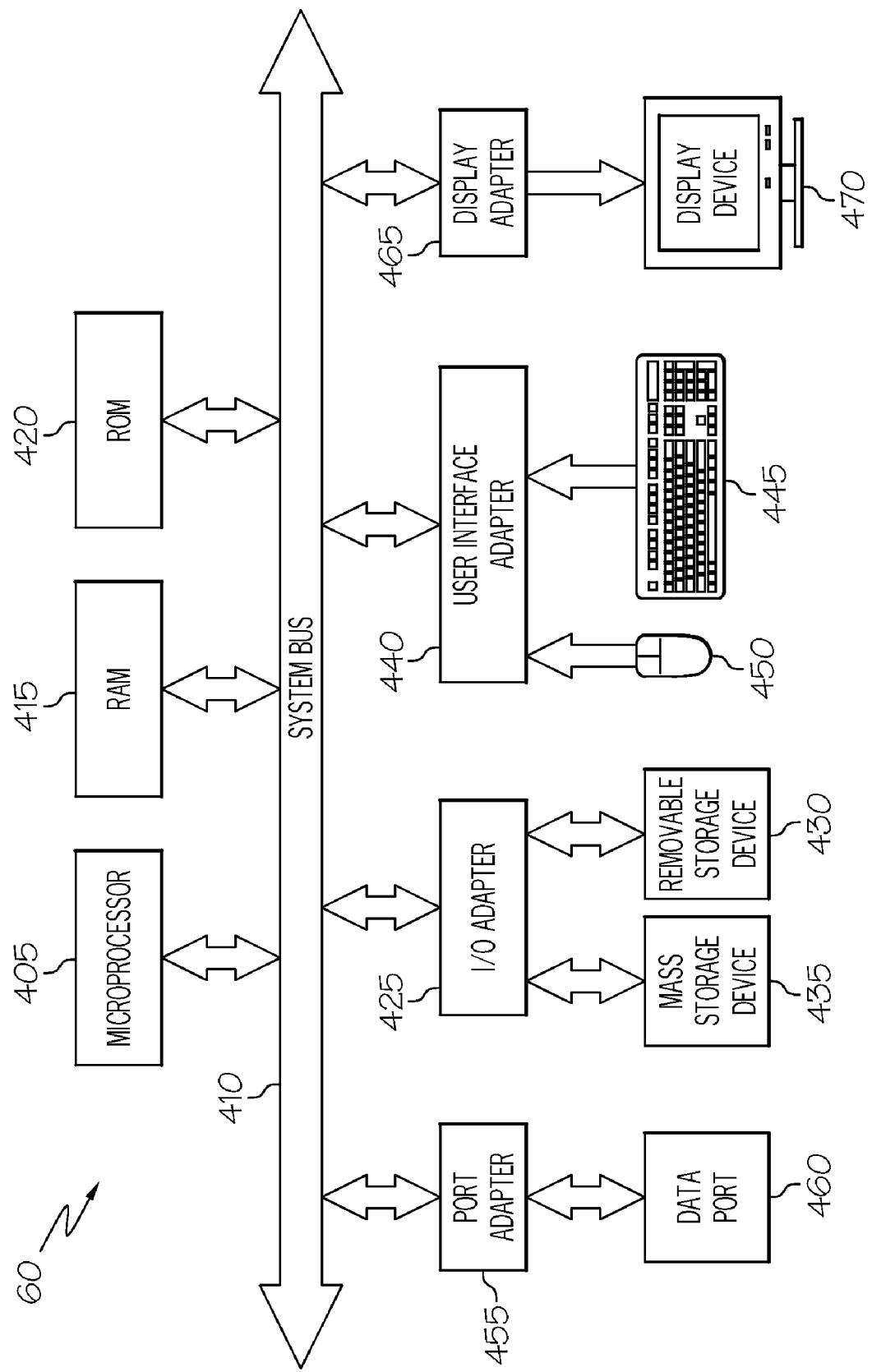
FIG. 7 is a schematic block diagram of a general purpose computer configured and disposed to initiate the cleaning operation for the system for cleaning the screen.

As discussed above, the method of cleaning a filtering screen described herein can also be practiced with a general-purpose computer such as illustrated at 400 in FIG. 7 and the method may be coded as a set of instructions on removable or hard media for use by the general-purpose computer 400. In FIG. 7, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The description of the exemplary embodiment has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of cleaning a screen in a semiconductor manufacturing process step that employs a chamber including a drain line having a screen configured and disposed in the chamber above the drain line to trap soluble materials, the method comprising:
    detecting a build-up of soluble material on the screen;
    ceasing a work operation in the chamber; and
    initiating a screen cleaning operation including:
        closing a computer operated valve fluidly connected to the drain line to fluidly isolate a portion of the chamber;
        automatically introducing an amount of solvent into the chamber once the computer operated valve is closed, the amount of solvent filling one of the chamber and the drain line to fully immerse the screen; and
        opening the computer operated valve after a predetermined amount of time to empty the one of the chamber and the drain line of solvent once the soluble materials trapped on the screen are dissolved.

2. The method of claim 1, further comprising: exhausting fumes from an upper portion of the chamber.

3. The method of claim 1, further comprising: detecting a pressure differential in the drain line.

4. The method of claim 3, further comprising: automatically initiating a screen cleaning operation based on the pressure differential in the drain line.

5. The method of claim 3, further comprising: calculating by a computer an amount of soluble material on the screen based on the pressure differential in the drain line.

6. The method of claim 5, wherein introducing the amount of solvent into the chamber includes adding enough solvent to fully immerse the screen but no more than required to dissolve the amount of soluble material on the screen.

7. The method of claim 1, wherein fluidly isolating the portion of the chamber includes preventing both liquids and gases in the chamber from entering the drain line.

8. A system for initiating a screen cleaning operation in a semiconductor processing chamber including a drain line having a screen configured and disposed in the chamber above the drain line to trap soluble materials, the system comprising:
    a central processing unit (CPU), said CPU being interconnected functionally via a system bus to:
    an input/output (I/O) adapter connecting to at least one of a removable data storage device, a program storage device, and a mass data storage device;
    a display adapter connecting to a display device; and
    at least one memory device thereupon stored a set of instructions which, when executed by said CPU, causes said system to:
        close a computer operated valve fluidly connected to the drain line to fluidly isolate a portion of the chamber;
        introduce an amount of solvent into the chamber once the computer operated valve is closed, the amount of solvent filling one of the chamber and the drain line to fully immerse the screen; and
        open the computer operated valve after a predetermined amount of time to empty the one of the chamber and the drain line of solvent once the soluble materials trapped on the screen are dissolved.

9. The system according to claim 8 wherein, the set of instructions which, when executed by said CPU, causes said system to: detect a build up of soluble material on the screen.

10. The system according to claim 9 wherein, the set of instructions which, when executed by said CPU, causes said system to: cease a work operation in the chamber upon detecting the build-up of soluble material on the screen.

11. The system according to claim 9, wherein, the set of instructions which, when executed by said CPU, causes said system to: sense a pressure differential in the drain line to detect the build-up of soluble material on the screen.

12. The system according to claim 11 wherein, the set of instructions which, when executed by said CPU, causes said system to: calculate an amount of soluble material on the screen based on the pressure differential in the drain line.

13. The system according to claim 12 wherein, the set of instructions which, when executed by said CPU, causes said system to: add enough solvent to fully immerse the screen but no more than required to dissolve the amount of soluble material detected on the screen.

14. The system according to claim 9 wherein, the set of instructions which, when executed by said CPU, causes said system to: automatically initiate the screen cleaning operation based on the detected build-up of soluble material on the screen.

15. The system according to claim 8 wherein, the set of instructions which, when executed by said CPU, causes said system to: exhaust fumes from an upper portion of the chamber.

16. The system according to claim 8 wherein, the set of instructions which, when executed by said CPU, causes said system to: prevent both liquids and gases in the chamber from entering the drain line.

17. The system according to claim 8 wherein, the set of instructions which, when executed by said CPU, causes said system to: open the valve to allow the amount of solvent to flow through the drain line once the screen is clean.

18. A semiconductor processing tool for producing products requiring solvents to remove soluble materials and surfaces required to remain free of foreign particles, the processing tool comprising:
 a chamber including a bottom portion and at least one side wall portion that defines an interior portion;
 a product support positioned within the interior portion;
 a drain line positioned below the product support, the drain line including a first end portion having an opening exposed in the interior portion of the chamber and a second end portion leading to a used solvent collection point;
 a pressure sensor operatively mounted to the drain line, the pressure sensor being configured and disposed to detect an amount of solvent passing through the screen;
 a screen positioned at the first end portion of the drain line;
 a first valve fluidly connected to the drain line, the first valve being selectively positioned to fluidly isolate the interior portion of the chamber from the second end portion of the drain line;
 an exhaust line positioned above the product support, the exhaust line including a first end section having an opening exposed in the interior portion of the chamber and a second end portion leading to a solvent fume collection point; and
 a second valve fluidly connected to the exhaust line, the second valve being selectively positioned to fluidly isolate the interior portion of the chamber from the second end portion of the exhaust line; and
 a controller operatively linked to the first and second valves and the pressure sensor, the controller being selectively operated to initiate a cleaning operation upon detection of a build-up of an amount of soluble material on the screen based on the amount of solvent passing through the screen.

19. The processing tool according to claim 18, wherein the chamber is a semiconductor processing chamber.

20. The processing tool according to claim 18, further comprising: another exhaust line extending between the drain line and the exhaust line, the first valve being configured and disposed to fluidly isolate the another exhaust line from the chamber when the interior portion is isolated from the second end portion of the drain line.

* * * * *